United States Patent
Bickler

[11] 3,739,182
[45] June 12, 1973

[54] ENERGY SENSITIVE READOUT DEVICE

[75] Inventor: Donald Bertram Bickler, Temple City, Calif.

[73] Assignee: Globe-Union Inc., Milwaukee, Wis.

[22] Filed: June 17, 1971

[21] Appl. No.: 154,059

[52] U.S. Cl. ......... 250/219 DC, 350/96 R, 250/227
[51] Int. Cl. ............................................... G08c 9/06
[58] Field of Search ............... 250/227, 219 DC, 250/212, 219 D; 350/96 R; 235/61.11 E

[56] References Cited
UNITED STATES PATENTS

| | | | |
|---|---|---|---|
| 3,162,860 | 12/1964 | McNaney | 250/227 X |
| 3,303,374 | 2/1967 | Fyler | 250/227 X |
| 3,232,795 | 2/1966 | Gillette et al. | 250/212 X |
| 3,619,068 | 11/1971 | Broerman | 250/227 X |
| 3,278,754 | 10/1966 | Wallace | 250/219 DC |

*Primary Examiner*—Walter Stolwein
*Attorney*—John Phillip Ryan, Benjamin G. Weil and Donald D. Denton

[57] ABSTRACT

A compact energy sensitive readout device capable of transmitting light signals that yield a high degree of signal resolution from an indicia bearing surface by presenting a plurality of spaced shielded light transmitting conduits that form individual light pathways with the light receiving end of each arranged in a common plane and the light transmitting end of each symmetrically angled and having attached thereto a radiant energy cell responsive to the energy conducted through the conduit.

12 Claims, 4 Drawing Figures

Patented June 12, 1973  3,739,182

INVENTOR
DONALD B. BICKLER

Patented June 12, 1973

INVENTOR
DONALD B. BICKLER

ENERGY SENSITIVE READOUT DEVICE

BACKGROUND OF THE INVENTION

This invention relates to a energy sensitive readout device for reading indicia bearing matrices. More particularly, the invention is concerned with an arrangement of energy transmitting conduits shielded one from the other, having energy receiving and transmission ends for the passage of energy therethrough with a radiant energy cell operatively attached to the energy transmission end of each conduit to translate the reading of the indicia when an energy source is applied to the indicia.

In the field of readout by energy sensors, such as light sensors, many devices have been produced that transmit light energy signals from a surface to be read. These devices, however, do not provide compactness of sensor cell operation combined with an arrangement for light source transmission that eliminates appreciable "cross-talk." For example, where a complex matrix of indicia is to be interpreted, one of the problems in the prior art devices is crossover of adjacent light energy signals being transmitted since considerable inaccuracy of energy signal decoding can be effected by the cross-talk caused thereby. This invention overcomes these disadvantages and presents a simplified readout device that is capable of producing accurate and definitive electrical impulses for the activation of impulse responsive mechanisms such as computers, control mechanisms and the like.

SUMMARY OF THE INVENTION

This invention contemplates a compact readout device having a plurality of parallel spaced energy transmitting conduits forming individual energy transmitting units separated by an opaque material such as plastic with each conduit having a photosensitive or radiant energy cell attached to energy transmitting ends thereof capable of being electrically responsive to the energy, such as light energy, transmitted through the conduit.

Advantageously, any number of the elongated conduits or pathways can be arranged in parallel rows in a composite block form, each conduit having an unobstructed flat receiving end and a light transmitting end with the light receiving ends positioned in a common plane. Attached directly to each of the light transmitting ends is a light responsive energy transducer capable of receiving the light energy transmitted through the conduit and converting the light energy so transmitted directly into a usable electrical signal. In order to facilitate the close positioning of the light transmitting conduits, the light transmission ends of the parallel rows of conduits are formed on an angle so that the radiant energy cells can be angularly positioned thereon and thus the cells in one row will not interfere with the cells in adjacent rows. The radiant energy cells are each attached to the light transmitting end of a respective conduit with appropriate electrical connections made to the cells. These electrical connections permit taking off electrical signals when light is conducted through the conduits and directed into contact with the energy cell. The cell electrical signals or impulses are then passed to devices capable of utilizing the signals or impulses.

Advantageously, the surface containing the light receiving ends may be covered with a hard transparent material such as glass so that the constant contact of indicia such as punched out cards to be read does not mar the light receiving ends of the conduits. Also, the radiant energy or light sensitive cells can be attached to the light transmitting ends of said conduits with a transparent adhesive so as to assure full transmission of light conducted through the conduits.

BRIEF DESCRIPTION OF THE DRAWINGS

The above and further objects and advantages of the invention will become more apparent from the drawings and description of preferred embodiments thereof which are presented as only illustrative and not as limitative of the inventive concepts herein.

DESCRIPTION OF THE PREFERRED EMBODIMENTS

Figure 1:
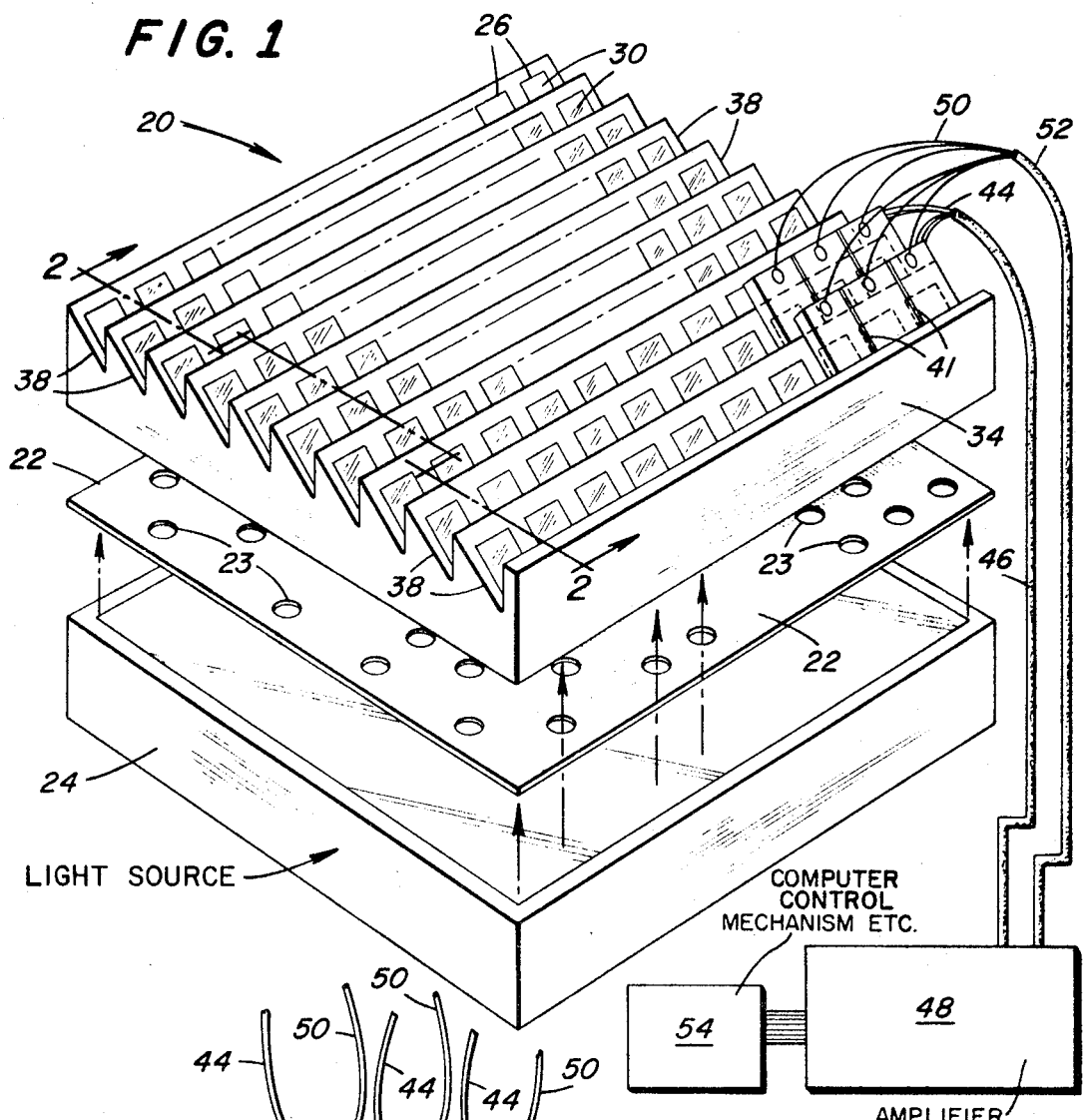
FIG. 1 is an enlarged perspective view of a readout device of this invention showing a punched card positioned intermediate the light receiving ends of the conduits and a light source for passing light through openings in the punched card to the energy sensitive cells.

Referring to the drawings, the photosensitive readout device of this invention is generally indicated by numeral 20. The readout device is shown with punched card 22 carrying indicia to be read out or decoded in the form of a pattern of punched holes 23. Under the punched card 22 is a light source 24 providing the light that is passed through holes 23 to be received by the readout device 20 (see FIG. 1).

Figure 2:
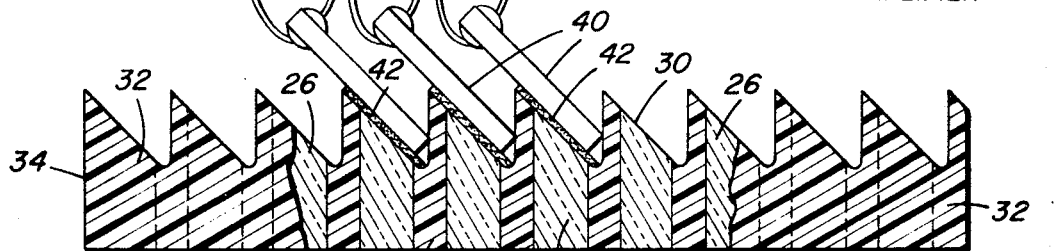
FIG. 2 is an enlarged side elevational view in cross-section taken along the planes of lines 2—2 of FIG. 1, showing a part of the light transmitting conduits surrounded with the opaque shielding material.

The readout device 20 is formed from a plurality of parallel light transmitting conduits or core means 26, each having a light receiving end 28 that is normal to its longitudinal axis, and a light transmitting end 30 that is angled to its longitudinal axis. The light transmitting conduits 26 are solid structures embedded along their sides in a matrix of opaque material 32 so as to form a solid block 34 of spaced parallel light transmitting conduits surrounded by opaque material with the flat light receiving ends 28 all positioned in a common plane 36 and the angled light transmitting ends 30 arranged in successive spaced parallel rows 38 (see FIGS. 1 and 2).

Each of the light transmitting conduits 26 is substantially square in cross-section which permits its lower end surface to receive and transmit a maximum of light rays, particularly where square punched hole configurations are used. It will be appreciated that the cross-sectional configuration of the conduits may be rectangular, round, or of any other shape. The upper end or transmitting surface of each conduit, being angled with respect to the longitudinal axis of the conduit, presents an enlarged flat surface which spreads the received light band for substantially direct contact of a large area of transmitted light to the flat of an energy sensor cell or chip 40 attached to its transmitting surface. Advantageously, each energy sensor cell 40 can be of a semi-conductor type having a capability of controlling the output of a power source impressed thereon or producing self-generated electrical power according to variations in intensity of the light rays or energy actively impinging on the cell. Photodiodes and phototransistors represent two types of energy sensor cells commonly used.

It can be seen that the upper surfaces of the light transmitting ends 30 of the conduits and the surrounding opaque material are contoured in a serrated configuration, with the sensor cells 40 spaced one from another preferably by insulation 41 and received in the notches produced by the serrated configuration. The high areas of the serrations thus form vertical light insulating walls between and extending to above the angled upper ends of the conduits to insure a minimum of cross-talk between the conduits.

As can be seen in the drawings, the sensor cells 40 are substantially rectangular flat polyhedrons disposed in a regular arrangement of rows of individual cells. The cells are placed in side-by-side edge alignment transverse of the block 34 and separated by photoresponsively inactive areas or the insulation 41. Each cell is attached so as to fully cover one of the flat angled surfaces forming the light transmitting ends 30 of the conduits 26. The attachment of the sensor cells 40 advantageously may be accomplished by a transparent adhesive 42 which allows for the maximum transmission of light rays from the conduits to the sensor cells. The shielding of the conduits provided by the opaque material 32 prevents wandering of light rays from one conduit to adjacent conduits during the readout operation, thereby substantially eliminating "cross-talk" or signal leakage between respective sensor cells. This arrangement provides for a clear, ungarbled transmission and readout of the light signals received by the sensor cells.

Each transverse row of sensor cells 40 is arranged substantially parallel to an adjoining row and overlaps it in a spaced-apart shingle-like configuration that allows for the close spacing of the conduits to form a compact readout device. Very good operation is achieved by this configuration which provides a maximum available area for light gathering and transmission to the sensor cells.

Extending from each sensor cell 40 is an electrical connector wire 44 which is operatively attached to the underside surface of the cell that is in contact with the light transmitting end 30 of each conduit 26. All of these electrical connector wires 44, one for each cell, are gathered together and pass as a unit 46 to an amplifier 48. In order to complete the electrical circuit, the other side of all of the sensor cells 40 have attached thereto a common lead wire 50 which electrically connects the backs of all the sensor cells together and to the amplifier 48 through line 52. This arrangement of connector wires 44 and common lead wire 50 provides a complete electrical circuit between the individual sensor cells 40 and the amplifier 48 so as to provide for an electrical impulse readout of the various light signals being passed through the conduits 26. The amplifier 48 can be operatively connected to any of a host of peripheral operating devices or mechanisms designated as 54, such as a computer or control mechanism or the like, for utilizing the readout of the light signals coming from the light source 24 through holes 23 of punch cards 22.

Figure 3:
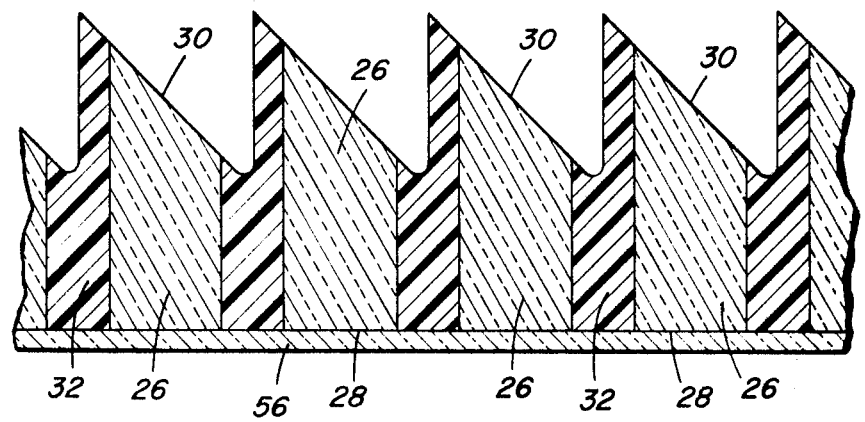
FIG. 3 is a partial side elevational view of the readout device shown in FIG. 2 showing a wear plate attached to the bottom portion thereof.

In a modification as shown by FIG. 3, the lower surface of the light receiving ends 28 of each conduit 26 can be provided with a cover formed by a plate-like wear surface or plate 56 of glass, sapphire or other light energy transparent material so that, in the use of punch cards or other materials during the readout operation, the underside surface of the device will offer a resistance to marring and thus not adversely affect the light transmission qualities of the device.

Figure 4:
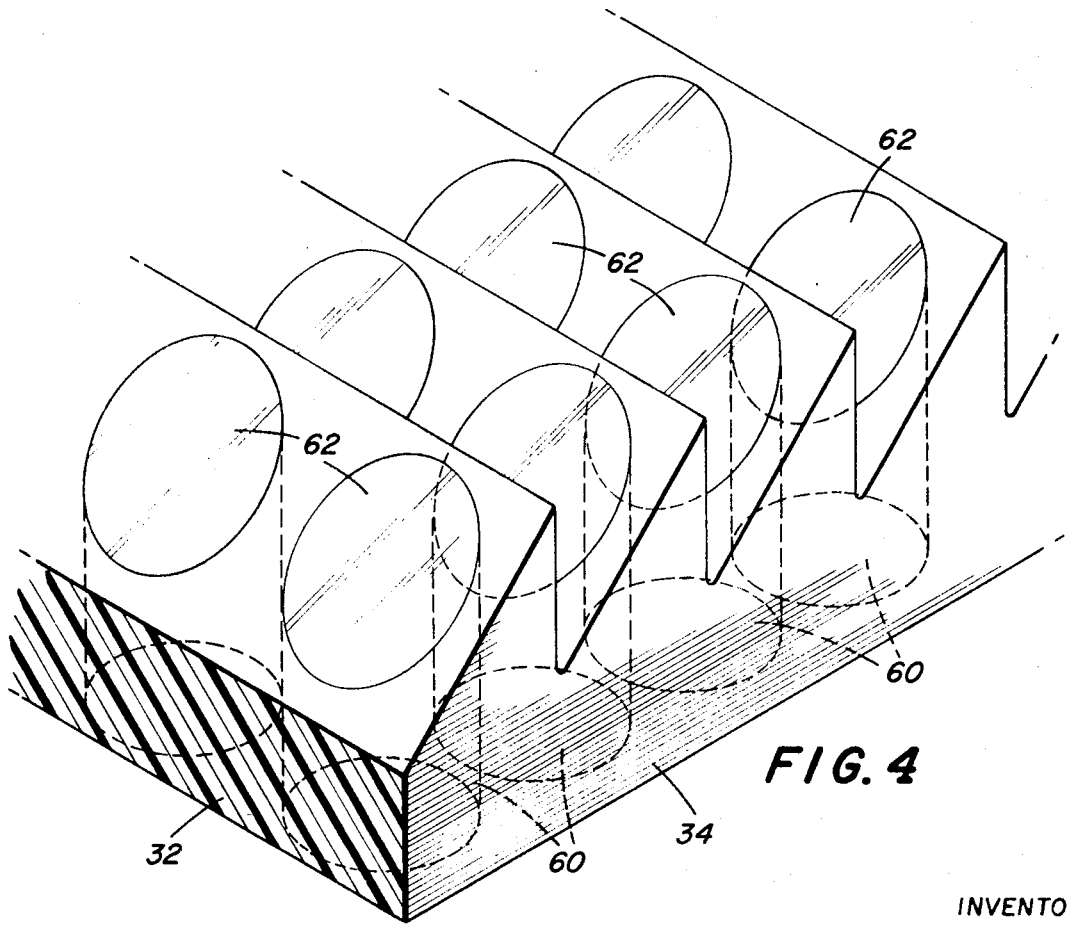
FIG. 4 is a partial perspective view of an alternate form of the readout device as shown in FIG. 1 using round conduits for the transmission of energy.

In a further modification shown in FIG. 4, light transmitting conduits 60 are in the shape of round cylinder-like rods with opaque material surrounding them in which case the upper end surfaces of the conduits 60 are angled to form flat elliptic surfaces 62. It will be appreciated that the conduits can take other forms and shapes including cross-sections that are regular or irregular or polygonal normal to the passage of light rays therethrough.

Suitable materials from which the conduits may be made are any light or ray energy transmitting materials, for example, transparent plastic material such as acrylic, polystyrene, polyester, epoxies, or the like. Glass, crystals or sapphire while not considered as machinable, but capable of being cut or ground, might also be used as conduit materials. Also, the opaque material surrounding the longitudinal surfaces of the light transmitting conduits may be any castable and/or machinable plastic or resin type material, for example, acrylic, polystyrene, polyester, epoxies, or the like; and the opaqueness can be provided by the addition of pigment.

It will be appreciated that the shape and relative positioning of the conduits 26 of this invention as well as the angled light transmitting ends can be varied to accommodate the particular application to which they are applied.

It has been found that good results are obtained by the device of this invention when the energy sensor cells that are attached to the angled light transmitting ends of the conduits are silicon photovoltaic readout cells of the types contained in Centralab Data Sheets R 800-1 and R 800-2 of Globe-Union, Inc., Copyrighted 1968.

It also will be appreciated that the sides of the conduits 26 may have a reflective covering thereon or may be polished in a manner so as to direct and guide light rays inwardly during their passage through the conduits.

The devices of this invention may be used to readout any form of indicia that will allow a surface pattern to be transmitted to the conduits by direct or reflected light rays or other ray energy, including infrared rays, that is effective to active the sensor cells. Some examples of the applications of the readout devices are the reading of credit cards, punch cards, price tags and receipts and inventory cards. When used to read such indicia, one or more of the readout devices are positioned over a light source with the electrical wire connections completed from the device to amplifier 48 and operating device or peripheral utilization means 54, which are provided with electrical power sources, not shown (see FIG. 1). The energy sensor or readout cells in each device may be in an overall arrangement as indicated or arranged in a pattern suitable to the indicia being read. Also, any number of the devices may be assembled together to produce an assembly or assemblies of the cells arranged in a desired preset pattern for readout of the data to be obtained when the devices are used. A punch card, for example, having indicia as a pattern of holes, is positioned for readout between the device and the light source, and the light source energized. Light emitted from this course penetrates the holes in the card and enters the conduits, travels through them and impinges on the attached sensor cells where the light is converted into an electrical impulse. The impulses are then utilized in the circuit completed through the sensor cells and amplifier to activate the operating device such as a computer or control mechanism or the like.

It will be appreciated that a major advantage of the matrix or device of this invention is that all the data from a given indicia bearing surface can be registered simultaneously without the necessity for a scanning type of readout.

It will be appreciated that the energy sensor cells may be individual semiconductor cells (photodiodes or phototransistors) separately attached to each conduit and spaced apart as shown, or the cells can be provided as parts of multiple active area type semiconductor chips or assemblies (not shown) in which each chip has a plurality of active semiconductor material areas or cells separated one from another by inactive areas and the chip is positionable as a unit so as to engage each active area over the light transmitting end of one of the conduits. When this is the arrangement, the active surface of each active area has one of the connector wires attached to it and the common lead wire completes the electrical circuit by connecting to the backs of the cells.

It will be obvious to those skilled in the art that various changes and modifications may be made in the embodiments presented herein without departing from the spirit and scope of the invention.

What is claimed is:

1. A compact energy sensitive readout device for use in interpreting, by ray energy reading, the surface pattern of indicia bearing material comprising a plurality of closely spaced solid, ray energy transmission conduit means positioned with their vertical axes in a plurality of rows in a multiplanar relationship, each having an end surface for receiving ray energy and surrounded along the side portions with an opaque material, and an end surface for transmitting ray energy passing therethrough with the remaining surface having means to shield against scattering of ray energy from one conduit means to another; said ray energy receiving end surfaces positioned to form an area for receiving energy that represents the surface pattern of said indicia-bearing material; and said ray energy transmitting end surfaces adapted to receive a plurality of sensor means for converting variable ray energy into corresponding variable electrical energy, one each of said sensor means operatively connectable to one of said end surfaces that transmits said ray energy; said shielding means including said plurality of rows of said end surfaces for transmitting said ray energy being inclined relative to the longitudinal axis of said conduit means to form a serrated surface for angularly receiving said sensor means; and a single source of ray energy for depicting the surface pattern of said indicia bearing material; whereby said variable ray energy can be transmitted according to the surface pattern of said indicia bearing material and converted to an electrical readout of said pattern and a compact ray energy sensitive readout device is provided.

2. The device of claim 1 in which said conduit means are polygonal in cross-section normal to the transmission of ray energy.

3. The device of claim 1 in which said conduit means are round in cross-section normal to the transmission of said ray energy.

4. The device of claim 1 in which said conduit means is formed from a transparent plastic material.

5. The device of claim 1 in which said conduit means is formed from a transparent crystal.

6. The device of claim 1 in which said conduit means is glass.

7. The device of claim 1 in which said sensor means is a light sensor means and is a silicon photovoltaic readout cell.

8. The device of claim 1 in which said sensor means are attachable by a transparent adhesive.

9. The device of claim 1 in which said ray energy is light.

10. The device of claim 1 in which said ray energy is infrared radiation.

11. The device of claim 1 in which said area for receiving ray energy has a transparent wear plate attached thereto.

12. The device of claim 1 further including a utilization means operatively connected to said sensor means.

* * * * *